United States Patent [19]
Aye

[11] Patent Number: 6,089,349
[45] Date of Patent: Jul. 18, 2000

[54] SOUND ABSORBER MAT WITH INTEGRALLY MOLDED RETAINER

[75] Inventor: Ronnie Lee Aye, Rockford, Mich.

[73] Assignee: Cascade Engineering, Inc., Grand Rapids, Mich.

[21] Appl. No.: 09/245,635

[22] Filed: Feb. 5, 1999

Related U.S. Application Data

[60] Provisional application No. 60/074,324, Feb. 11, 1998.

[51] Int. Cl.[7] .................................................. E04B 1/82
[52] U.S. Cl. ...................... 181/284; 181/290; 264/45.1; 264/46.4
[58] Field of Search .................................... 181/284, 286, 181/290, 285; 264/40.5, 46.4, 46.5, 46.6, 45.1, 45.2

[56] References Cited

U.S. PATENT DOCUMENTS

| | | |
|---|---|---|
| 5,195,793 | 3/1993 | Maki . |
| 5,483,028 | 1/1996 | Holwerda ........................ 181/290 |
| 5,601,899 | 2/1997 | Campbell . |
| 5,831,225 | 11/1998 | Campbell . |

*Primary Examiner*—Khanh Dang
*Attorney, Agent, or Firm*—Rader, Fishman, Grauer & Mc Garry, An Office of Rader Fishman & Grauer PLLC

[57] ABSTRACT

A dash mat for a vehicle comprising a passenger compartment and an engine compartment separated by a firewall. The dash mat comprises a decoupling layer with multiple openings and a sound barrier layer with integrally molded fasteners that are received within the decoupling layer openings to secure together the decoupling and sound barrier layers. The fasteners have at least one flange portion that overlies the sound barrier to capture a portion of the decoupling layer between the flange and the sound barrier.

24 Claims, 4 Drawing Sheets

SOUND ABSORBER MAT WITH INTEGRALLY MOLDED RETAINER

RELATED APPLICATIONS

This application claims the benefit of U.S. Provisional Application No. 60/074,324 filed on Feb. 11, 1998.

BACKGROUND OF THE INVENTION

1. Field of the Invention

This invention relates to dash mats. In one of its aspects, the invention relates to a dash mat with integral retainers for fastening a secondary layer thereto. In another of its aspects, the invention relates to a sound absorbing vehicle dash mat having integral retainers for fastening a sound absorber layer to a sound barrier layer to form the dash mat. In another of its aspects, the invention relates to a method for making a dash mat.

2. Description of the Related Art

In most contemporary automobiles, a steel firewall separates the engine compartment from the passenger compartment. To reduce the transmission of sound from the engine compartment through the firewall and into the passenger compartment, a dash mat overlies the firewall and retards the transfer of mechanical and sonic vibrations from the engine compartment into the passenger compartment through the firewall. The dash mat typically comprises a sound absorber layer, abutting the firewall, and a sound barrier layer abutting the sound absorber layer.

The sound absorber layer is commonly made from an open-cell foam to attenuate the mechanical vibrations. The sound barrier layer is commonly made from a relatively dense material, such as an elastomer, to block the transfer of sonic vibrations.

An outer surface of the sound barrier layer is typically in contact with a bottom surface of the vehicle carpet and extends beyond the carpet to an upper portion of the firewall behind the instrument panel.

It is common to attach the absorber layer to the sound barrier layer through the application of hot melt glue or spray adhesive. Adhesives that are capable of bonding the foam material to the elastomer are typically ozone depleting and must be handled with extreme care. Many of these types of adhesives are no longer being manufactured due to environmental concerns and new industrial standards. A technique known as heat staking has been used as an alternative to ozone-depleting adhesives. However, the layers must be properly aligned and temporarily fastened together before heat staking. It would be advantageous to attach the absorber layer to the sound insulating layer without the difficulties encountered with adhesives or temporary fasteners.

SUMMARY OF THE INVENTION

The invention improves the ease of assembling the sound absorbing and sound barrier layers of a vehicle dash mat over the prior art. In one of its aspects, the invention relates to a dash mat comprising a decoupling layer and a sound barrier layer that are connected by at least one fastener. The decoupling layer has at least one opening and is adapted to abut a firewall of a vehicle passenger compartment. The sound barrier layer abuts the decoupling layer and the at least one fastener is integrally formed in the barrier layer. The fastener extends at least partially through the at least one decoupling layer opening and has a laterally projecting retaining flange extending at least partially over a portion of the decoupling layer to thereby capture a portion of the decoupling layer between the retaining flange and the barrier layer to secure the sound barrier layer to the decoupling layer.

The dash mat can comprise at least two retaining flanges that are directed in substantially opposing directions to capture different portions of the decoupling layer to thereby retain the decoupling layer to the sound barrier layer. Alternatively, the at least two retaining flanges can be positioned within the same decoupling layer opening or can be positioned within two different decoupling layer openings.

Preferably, the fasteners have a proximal end near the absorbing layer and terminate in a distal end. The transverse cross section of the proximal end is larger than the transverse cross section of the distal end. The transverse cross section can continuously reduce in area from the proximal end toward the distal end. The fastener preferably has an arcuate shape or a linear shape. Additionally, the cross section is preferably circular. A projection can extend from the sound barrier layer and is spaced from the junction of a corresponding fastener in the sound barrier layer to thereby enhance the capturing of the portion of the decoupling layer.

In another aspect of the invention, the dash mat comprises a decoupling layer and a sound barrier layer that are connected by at least one fastener. The decoupling layer has at least one opening and is adapted to abut a firewall of a vehicle passenger compartment. The sound barrier layer abuts the decoupling layer. The at least one fastener is integrally formed in the barrier layer and extends at least partially through the at least one decoupling layer opening. The fastener has a laterally projecting retaining flange with multiple portions directed in different directions. The multiple portions extend at least partially over a portion of the decoupling layer to thereby capture the portion of the decoupling layer between the retaining flange portions and the barrier layer.

In yet another aspect of the invention, the invention relates to a method for making a dash mat comprising a generally planar decoupling layer with at least one opening and a generally planar sound barrier layer connected by at least one fastener extending into the at least one opening. The method comprises integrally molding the fastener with the barrier layer such that the fastener has a laterally projecting retaining flange that extends at least partially away from and over a portion of the sound barrier layer to thereby capture a portion of the decoupling layer between the retaining flange and the sound barrier layer when the fastener is inserted through the decoupling layer opening.

The step of integrally molding the fastener can include forming a mold cavity in the shape of the sound barrier layer and the at least one fastener by opposing upper and lower mold cores and then injecting thermoplastic resin into the mold cavity. The step of removing the sound barrier and integral fastener from the mold cavity is preferably accomplished by separating the upper and lower mold cores while applying pressure on the sound barrier near the junction of the fastener and the sound barrier. Preferably, the cavity for the sound barrier layer is formed in the lower mold core and a lower surface of the upper mold core and a cavity for the fastener is formed in the upper mold core.

The step of applying pressure preferably includes providing a push pin in the upper mold core that extends away from the upper mold core as the cores are separated to apply the pressure on the sound barrier and positioning the push pin a sufficient distance from the junction to prevent the pinching of the fastener between the upper mold core and the push pin as the fastener is removed from the mold core. Preferably, the push pin is positioned so that the shortest distance between the outer surface of the push pin and a junction of the upper mold core cavity and the upper mold core lower surface is always greater than the thickness of a portion of the fastener passing through the shortest distance throughout the removal of the sound barrier and integral fastener.

The dash mat is assembled by pressing the at least one fastener through the decoupling layer opening until the retaining flange overlies at least a portion of the decoupling layer.

BRIEF DESCRIPTION OF THE DRAWINGS

The invention will now be described with reference to the drawings in which.

DETAILED DESCRIPTION OF THE PREFERRED EMBODIMENTS

Figure 1:
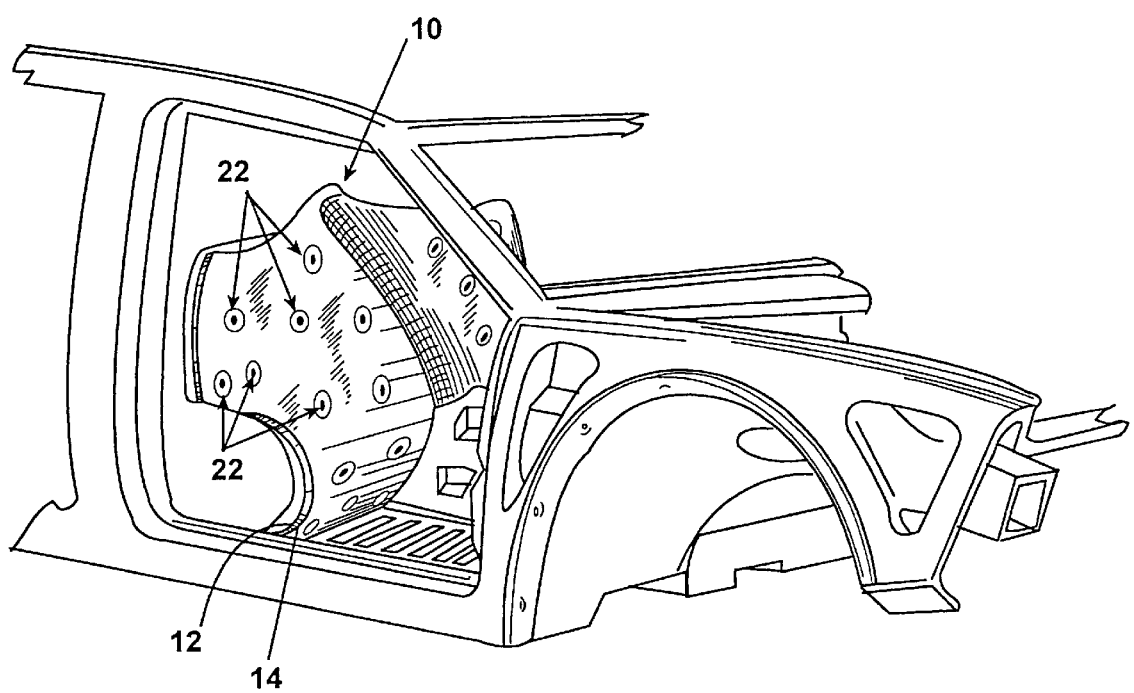
FIG. 1 illustrates a partial view of a vehicle and a dash mat assembly according to the invention.
Figure 2:
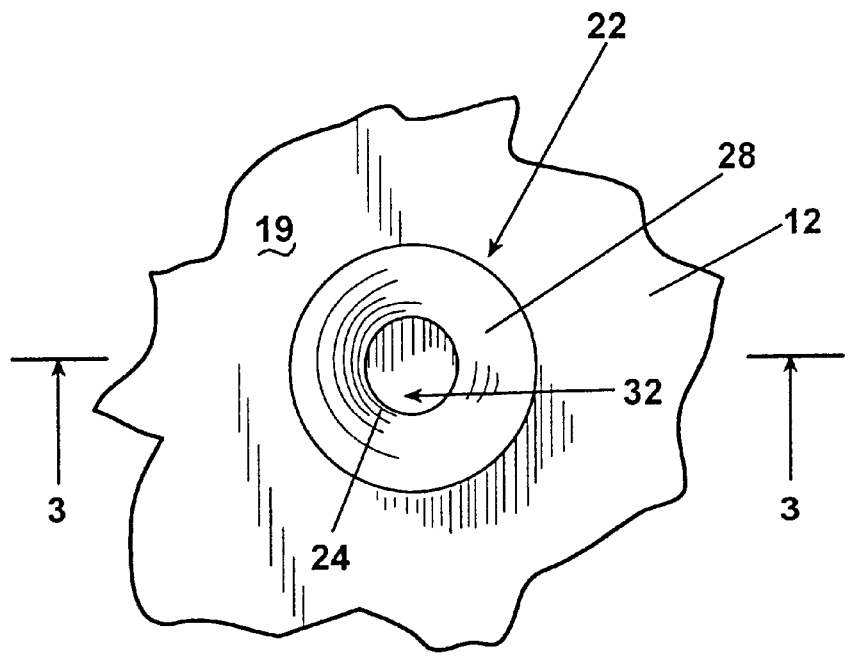
FIG. 2 is a top plan view of a portion of the vehicle dash mat of FIG. 1.

Referring now to FIG. 1, a dash mat assembly is shown in part in a portion of a vehicle body. As further shown in FIGS. 2 and 3, the dash mat assembly 10 includes an outer sound barrier mat or layer 12 and an inner sound absorber mat or layer 14. The outer sound barrier layer 12 is preferably made of a relatively stiff thermoplastic or elastomeric material, while the inner absorber layer 14 is preferably formed of a flexible open-cell foam material. An inner surface 18 of the sound absorber layer 14 is typically positioned against a vehicle firewall 8, while an outer surface 16 thereof is adapted to face an inner surface 19 of the sound barrier layer 12. An outer surface 20 of the sound barrier layer 12 faces the underside of a vehicle carpet (not shown) and typically extends past the carpet behind the instrument panel.

Multiple fasteners 22 connect the sound barrier layer 12 to the sound absorber layer 14. Preferably, each fastener 22 comprises a circumferentially extending wall 24 having an annular base 26 that is formed integrally, preferably as one piece, with the sound barrier layer 12 and a circumferentially extending flange portion 28. Preferably, the annular base 22 is relatively thick in cross section to provide rigidity at the intersection of the sound barrier layer 12 and the fastener, while the flange portion 28 is relatively thin in cross section to provide flexibility to the wall 24. An inner surface 30 of the wall 24 and the inner surface 19 of the sound barrier layer 12 form an interior space 32.

Figure 3:
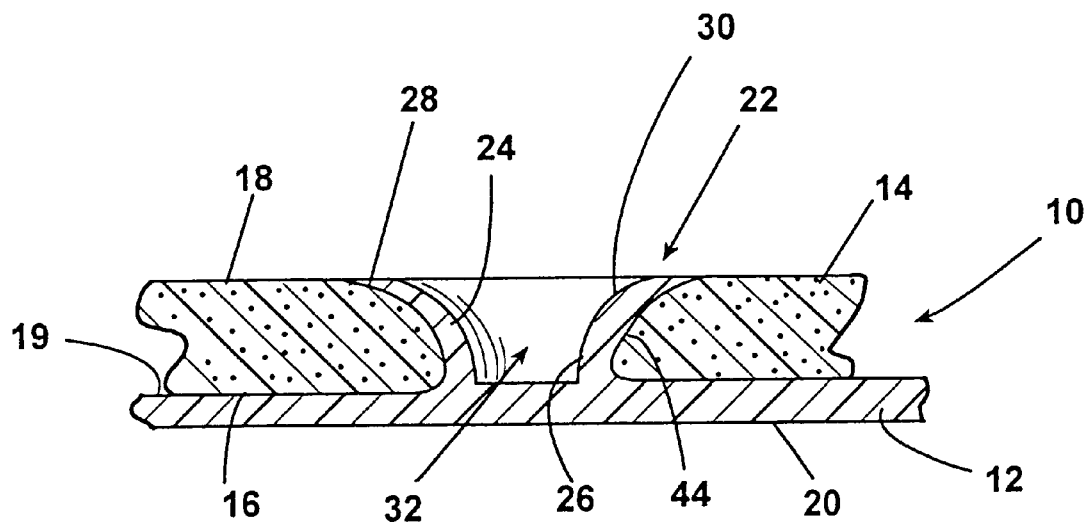
FIG. 3 is a cross-sectional view taken along line 3—3 of FIG. 2 and showing the fastening of the absorber layer and sound barrier layer.

As best seen in FIG. 3, a cross section of the fastener illustrates the decreasing thickness or cross sectional area of the fastener, which tapers from a greatest cross section at its proximal end or base to a much smaller cross section at its tip or distal end. The fastener also has a generally arcuate shape in cross section, resulting in the flange portion projecting over the sound barrier layer.

The sound absorber layer 14 includes an opening 44 dimensioned to snugly receive the fastener 22 when the sound absorber layer 14 and sound barrier layer 12 are mounted to each other. The opening 44 can be shaped to conform with the outer periphery of the fastener 22. Preferably, the opening 44 is shaped to snugly receive the rigid base 26 and the wall 24 and flange 28 at least abut the opening 44 when installed to retain at least a portion of the decoupling layer between the flange 28 and the sound barrier layer 12.

The sound absorber layer 14 is mounted to the sound barrier layer 12 by aligning the opening 44 with the fastener 22 and pushing the two layers together to force the fastener 22 through opening 44. Although the opening 44 of the absorber layer 14 is smaller in diameter than the effective diameter of the flange portion 28, the mat is sufficiently flexible to permit expansion of the opening 44 over the flange portion 28. The flexible flange portion 28 and wall 24 also aid in the insertion because the flange portion 28 is sufficiently flexible to deform during the assembly process and effectively reduce the diameter of the fastener 22. The curved shape and flexibility of the flange portion 28 also facilitates expansion of the opening 44 and prevents tearing of the absorber layer 14 during installation on the sound barrier mat 12. Once the fastener 22 is inserted a sufficient distance, the flange 28 can spring back from its deformed position due to the inherent resiliency of the flange 28 and can lie against the surface of the opening 44 to complete the connection of the sound barrier layer 12 to the absorbing layer 14.

Figure 4:
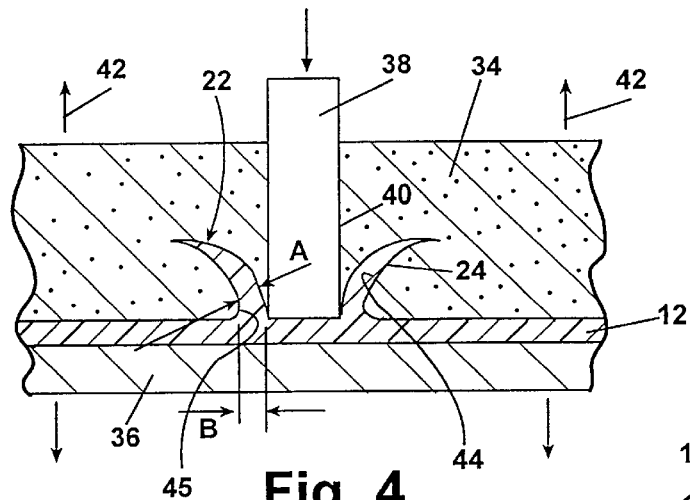
FIG. 4 is a cross-sectional view of a portion of the dash mat illustrated in FIGS. 1–3 and a portion of a mold assembly for forming the dash mat.

As shown in FIG. 4, a mold assembly has upper and lower cores 34 and 36 that are mounted in a conventional injection molding apparatus (not shown) so that they move toward each other to form a single cavity for molding the mat and fastener and move away from each other after molding to eject the integrally molded mat and fastener. Accordingly, this configuration greatly reduces molding and manufacturing costs over cores having multiple components and movements. The upper core 34 includes a bore 40 that is in alignment with the interior space 32 of the fastener 22. A push pin 38 is mounted for slidable movement in the bore 40. After the molding operation, the core 34 is moved in a direction away from the core 36 as represented by arrows 42. Simultaneously, the pin 38 is held against the inner surface 19 of the dash mat within the interior chamber 32. As the upper core continues its movement away from the lower core 36, the wall 24 of the fastener 22 flexes toward the pin 38 until the upper core is clear of the fastener. The pin 38 can then be released to separate the dash mat from the lower core 36.

Generally, the thickness of the fastener 22 tapers from the base thickness B—B to the distal end to facilitate the removal of the fastener 22 from the mold half 34 although the thickness can vary along the length. It is important that the thickness of the fastener 22 at the location between the arrows A—A is generally equal to or less than the thickness B—B of the fastener 22 at the base. In some instances, it may be desirable to increase the thickness of the fastener at A—A. The thickness A—A represents the largest effective thickness of the fastener 22 between the opening 44 and the push pin 38 as the fastener 22 is removed from the mold.

It is possible to make the gap B—B slightly less than the effective maximum thickness A—A because of the inherent elasticity of the preferred material. However, the more narrow is the gap B—B relative to the effective maximum thickness A—A, the more difficult it will be to withdraw the mat from the mold without damage.

Figure 5:
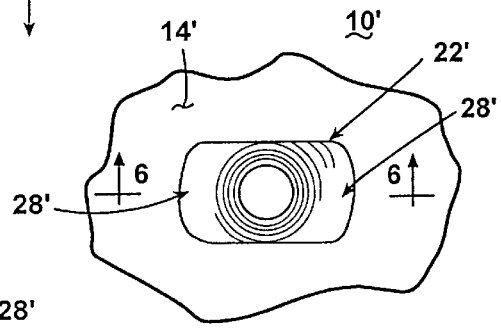
FIG. 5 is a top plan view of a second embodiment of a dash mat and integral fastener according to the invention.
Figure 6:
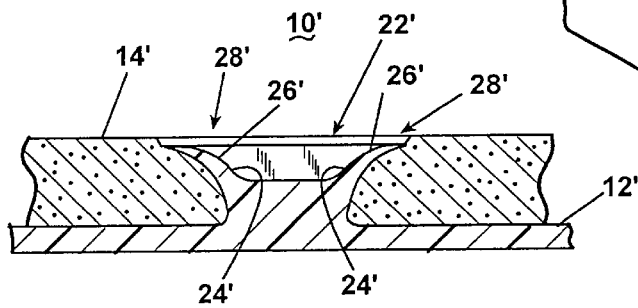
FIG. 6 is a cross-sectional view taken along line 6—6 of FIG. 5.

FIGS. 5 and 6 illustrate a second embodiment of the dash mat assembly according to the invention. The second embodiment is similar to the first embodiment and corresponding parts will be identified with the same numeral and the suffix'.

The second embodiment dash mat assembly 10' comprises a sound barrier layer 12' coupled to a decoupling layer 14' by a fastener 22'. The fastener 22' is integrally formed with the sound barrier layer 12 and includes at least two distinct flanges 28', which are preferably in opposing relationship.

Each of the flanges 28' comprises a base or portion 24' that transitions into a wall or overhanging portion 26'. The lower portion 24' is substantially thicker than the flange 28', which tapers to a reduced thickness from the portion 24'.

Figure 7:
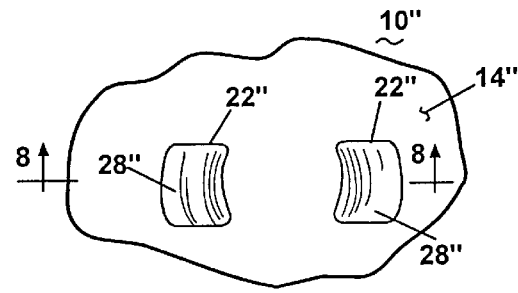
FIG. 7 is a top plan view of the third embodiment of a dash mat and integral fastener according to the invention.
Figure 8:
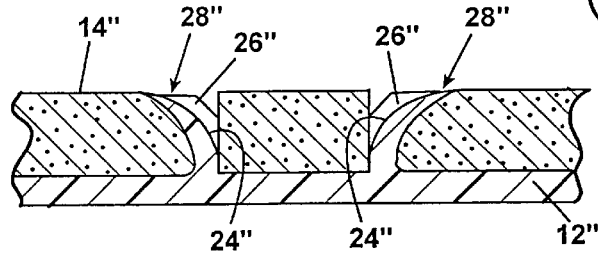
FIG. 8 is a cross-sectional view taken along line 8—8 of FIG. 7.

FIGS. 7 and 8 illustrate a third embodiment according to the invention. The third embodiment is similar to the first and second embodiments and similar parts will be identified with the same numeral and the suffix".

The third embodiment 10" comprises a sound barrier layer 12" and a decoupling layer 14" having multiple openings 44" through which fasteners 22" extend to couple the sound barrier layer 12" to the decoupling layer 14".

Each of the fasteners 22 is integrally formed with the sound barrier layer 12" and comprises a base portion 24" extending upwardly from the sound barrier layer 12" and transitioning into a tapered flange 28" that overlies a portion of the decoupling layer 14" to capture a portion of the decoupling layer 14" between the fastener 22" and the sound barrier layer 12". The fastener 22" has only a single flange 28" that extends through the opening 44" and the decoupling layer 14". The single flange 28" includes a thick base or lower portion 24" and a tapered upper portion 26". It is preferred that multiple fasteners 22" be used to couple the sound barrier layer 12" and the decoupling layer 14" and that some of the fasteners 22" are oriented in a different direction, preferably in opposing directions, to help secure the decoupling layer 14" to the sound barrier layer 12".

Figure 9:
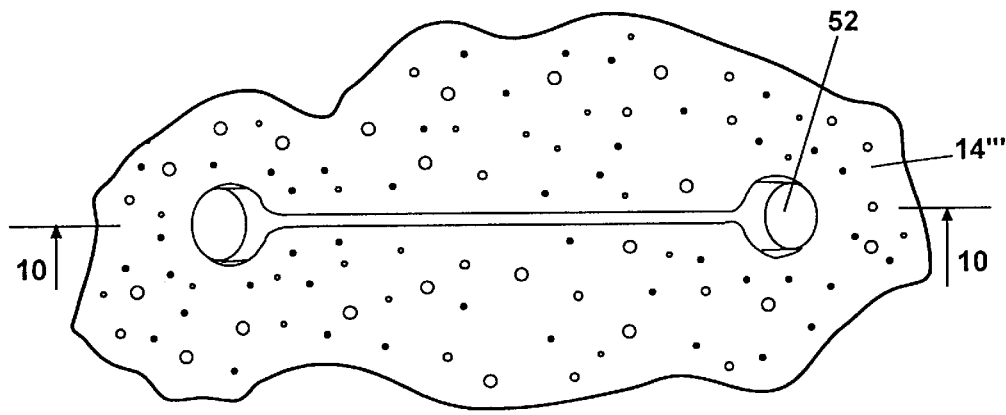
FIG. 9 is a top plan view of a fourth embodiment of a dash mat and integral fastener according to the invention.
Figure 10:
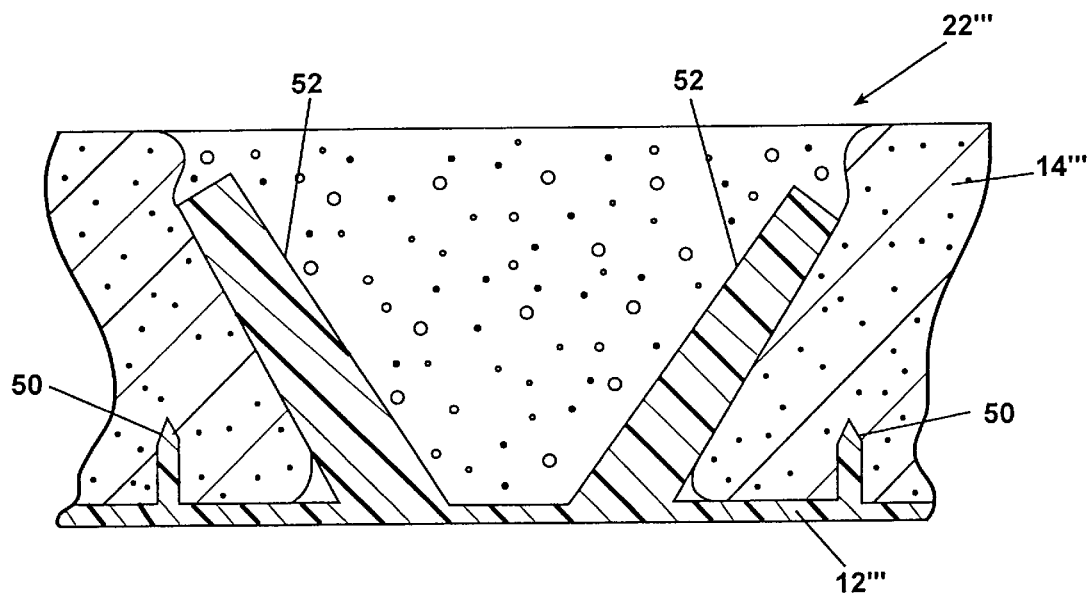
FIG. 10 is a cross-sectional view taken along line 10—10 of FIG. 9.

FIGS. 9 and 10 illustrate a fourth embodiment of a dash mat according to the invention. The dash mat of the fourth embodiment is similar to the previous embodiments and similar parts will be identified with the same number as the previous embodiments and the suffix'''.

A dash mat 10''' according to the fourth embodiment comprises a sound barrier layer 12''' and a decoupling layer 14''' having multiple openings 44''' through which fasteners 22''' extend to couple the sound barrier layer 12''' to the decoupling layer 14'''.

Traps 50 are preferably also formed in the sound barrier layer 12''' and are positioned beneath the fasteners 22''' to aid in retaining the decoupling layer 14''' beneath the fastener 22'''.

Each of the fasteners 22''' comprises a pair of opposed fingers 52 oriented at an acute angle with respect to the surface plane of the sound barrier layer 12'''. Each of the opposing fingers 52 preferably have a circular cross section that tapers or reduces in diameter as the finger 52 extends away from the sound barrier layer 12'''. The tapered cross section enhances the ease of removing the fastener 22''' from the upper mold core without tearing or damaging the fingers 52.

The traps 50 are shown with the center lines thereof disposed directly beneath the outermost point of the fingers 52. However, the location of the traps 50 are not so limited for the invention to function as designed. The traps 50 can be placed anywhere on the sound barrier layer 12''' as long as there is sufficient trapping of at least a portion of the decoupling layer 14''' between the finger 52 and the trap 50.

Preferably, the trap 50 has a pointed tip as illustrated in FIGS. 9 and 10 to better catch or trap and hold a portion of the decoupling layer 14'''. However, it is within the scope of the invention for the trap 50 to have an unpointed tip. Any suitably sized protrusion extending from the sound barrier 12''' can adequately perform the trapping function. The trap 50 can be used with any of the previous embodiments. Further, the embodiment of FIGS. 9 and 10 can be used without the traps 50.

A unique advantage of this integral fastener arrangement over conventional securing techniques is that the foam material can slide over the stiffer elastomeric material when flexed, thereby eliminating shearing of the foam material and thus separation of the foam material from the elastomeric material at the shear interface. Thus, a simple, effective and cost reducing fastener is provided for attaching an absorber layer to a sound barrier layer.

Whereas the invention has been described in connection with attaching an absorber layer to a sound barrier layer for use with a vehicle firewall, it is to be understood that the invention is not necessarily so limited, and that the invention can be practiced where two layers of material, one layer of which is flexible, are to be joined together. Moreover, while only a single integrally molded fastener has been described, it is to be understood that a plurality of integrally molded fasteners can be located at various positions along the dash mat to securely hold the absorber layer. The fasteners can include one or more flanges that extend through the same opening. For the fasteners having a single flange without an opposing portion, it is preferred that the fasteners are arranged on the sound absorbing layer so their flanges are oriented in different directions. For the fasteners having multiple flanges, the flanges are also preferably oriented at different directions.

Reasonable variation and modification are possible within the spirit of the foregoing specification and drawings without departing from the scope of the invention. For example, the overall height of the fastener may be adjusted to match different absorber layer heights.

I claim:

1. In a dash mat for use in a vehicle comprising a passenger compartment and an engine compartment separated by a firewall, the dash mat comprising a decoupling layer and a sound barrier layer connected by at least one fastener, the decoupling layer having at least one opening and abutting the firewall, and the sound barrier layer abutting the decoupling layer, the improvement comprising:

the at least one fastener is integrally formed in the barrier layer, extends at least partially through the at least one decoupling layer opening and has a laterally projecting retaining flange extending at least partially over a portion of the decoupling layer to thereby capture a portion of the decoupling layer between the retaining flange and the barrier layer.

2. The dash mat according to claim 1 wherein there are at least two retaining flanges which are directed in substantially opposing directions.

3. The dash mat according to claim 2 wherein there are at least two retaining flanges that are positioned in the same decoupling layer opening.

4. The dash mat according to claim 2 wherein there are at least two retaining flanges and at least two decoupling layer openings and the at least two retaining flanges are positioned in a different one of the at least two decoupling layer openings.

5. The dash mat according to claim 1 wherein at least one of the fastener has a proximal end near the absorbing layer and terminating in a distal end, and the at least one fastener having a transverse cross section at the proximal end that is larger than a transverse cross section at the distal end.

6. The dash mat according to claim 5 wherein the transverse cross continuously reduces from the proximal end to the distal end.

7. The dash mat according to claim 6 wherein the at least one fastener has a substantially arcuate shape.

8. The dash mat according to claim 6 wherein the at least one fastener has a substantially linear shape.

9. The dash mat according to claim 5 wherein the transverse cross section has a substantially circular cross section.

10. The dash mat according to claim 1 wherein at least one of the openings is formed by a slit in the decoupling layer.

11. The dash mat according to claim 1, and further comprising a projection corresponding to one of the fasteners and extending upwardly from the sound barrier layer and spaced from the junction of the corresponding fastener and the sound barrier layer to thereby enhance the capturing of the portion of the decoupling layer.

12. The dash mat according to claim 1 wherein the sound barrier layer is made from an elastic material.

13. The dash mat according to claim 1 wherein the decoupling layer is made from an open-cell foam.

14. In a dash mat for use in a vehicle comprising a passenger compartment and an engine compartment separated by a firewall, the dash mat comprising a decoupling layer and a sound barrier layer connected by at least one fastener, the decoupling layer having at least one opening and abutting the firewall, and the sound barrier layer abutting the decoupling layer, the improvement comprising:

the at least one fastener is integrally formed in the barrier layer, extends at least partially through the at least one decoupling layer opening and has a laterally projecting retaining flange with multiple portions directed in a different direction and extending at least partially over a portion of the decoupling layer to thereby capture the portion of the decoupling layer between the retaining flange portions and the barrier layer.

15. The dash mat according to claim 14 wherein the at least one fastener has a proximal end near the barrier layer and each flange portion terminates in a distal end and the flange has a transverse cross section that is larger at the proximal end than at the distal end.

16. The dash mat according to claim 15 wherein the at least one fastener portion has a substantially arcuate shape.

17. The dash mat according to claim 15 wherein the transverse cross section has a substantially circular shape.

18. The dash mat according to claim 15 wherein the transverse cross continuously reduces from the proximal end to the distal end.

19. A method for making a dash mat for use in a vehicle comprising a passenger compartment and an engine compartment separated by a firewall, the dash mat comprising a generally planar decoupling layer with at least one opening and a generally planar sound barrier layer connected by at least one fastener extending into the at least one opening, the method comprising:

integrally molding the fastener with the barrier layer such that the fastener has a laterally projecting retaining flange extending at least partially away from and over a portion of the sound barrier layer to thereby capture a portion of the decoupling layer between the retaining flange and the sound barrier layer when the fastener is inserted through the decoupling layer opening.

20. The method according to claim 19 wherein the integrally molding step includes forming a mold cavity in the shape of the sound barrier layer and the at least one fastener by opposing upper and lower mold cores and injecting thermoplastic resin into the mold cavity.

21. The method according to claim 20, and further comprising the step of removing the sound barrier and integral fastener from the mold cavity by separating the upper and lower mold cores while applying pressure on the sound barrier near the fastener and the sound barrier junction.

22. The method according to claim 21 wherein the cavity for the sound barrier layer is formed in the lower mold core and a lower surface of the upper mold core and the cavity for the fastener is formed in the upper mold core.

23. The method according to claim 22 wherein the step of applying pressure includes providing a push pin in the upper mold core that extends away from the upper mold core as the cores are separated to apply the pressure on the sound barrier and positioning the push pin a sufficient distance from the junction to prevent the pinching of the fastener between the upper mold core and the push pin as the fastener is removed from the upper mold core.

24. The method according to claim 20 and further comprising pressing the at least one fastener through the decoupling layer opening until the retaining flange overlies at least a portion of the decoupling layer.

* * * * *